UNITED STATES PATENT OFFICE.

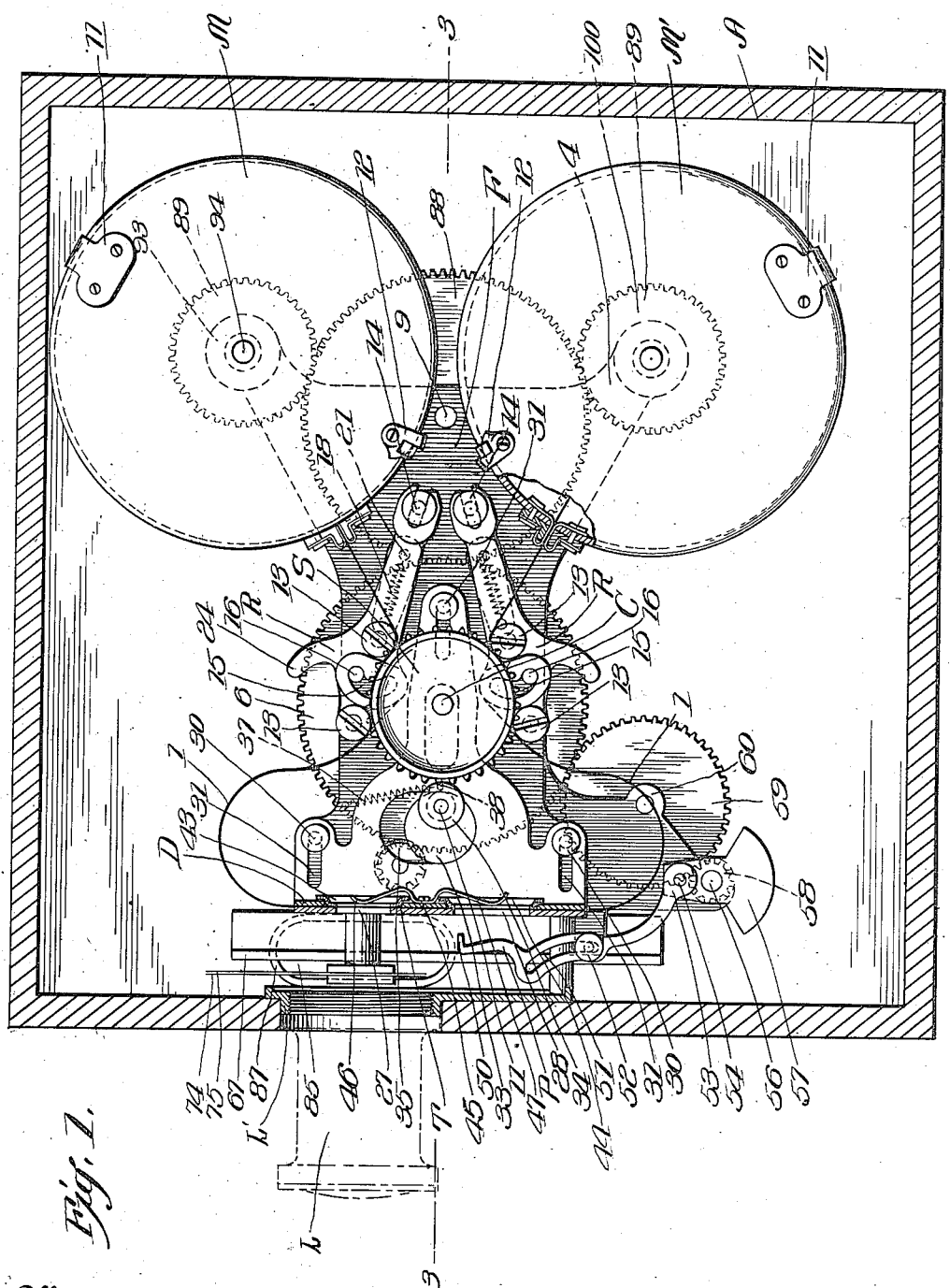

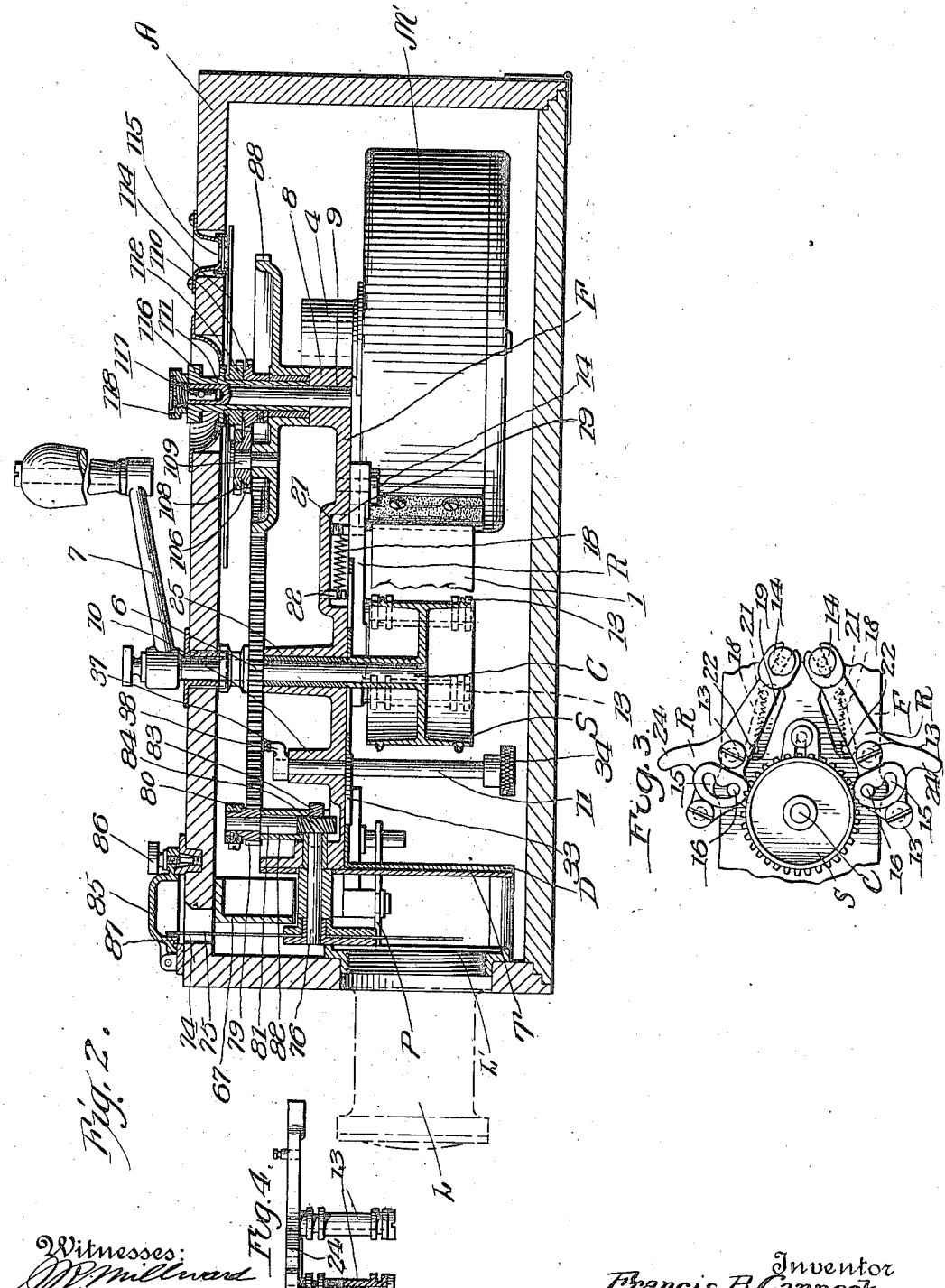

FRANCIS B. CANNOCK, OF NEW YORK, N. Y.

MOTION-PICTURE CAMERA.

1,181,432. Specification of Letters Patent. Patented May 2, 1916.

Application filed February 12, 1914. Serial No. 818,204.

*To all whom it may concern:*

Be it known that I, FRANCIS B. CANNOCK, a citizen of the United States, residing at New York city, in the county of New York and State of New York, have invented new and useful Improvements in Motion-Picture Cameras, of which the following is a specification.

My invention relates to motion picture cameras, in which the scenes are photographed on the film, and consists in certain new features whereby a more accurate and perfect camera is produced and much better pictures are taken.

An important feature of my invention consists of an improved means for holding the film on the feed sprocket which is designed to be easily adjustable so as to release the film when desired and to be locked positively against movement radially under pressure produced thereon by the film.

A desirable embodiment of my invention is shown in the accompanying drawings wherein the reference characters of this description are applied to corresponding parts in the several views.

Figure 1 is an elevation of the operating mechanism of my improved camera taken on the film supporting side thereof. Fig. 2 is a horizontal cross section of Fig. 1 taken on line 3—3 thereof. Fig. 3 is a side elevation of the sprocket and pad-roller arms showing the latter swung out of operative position and Fig. 4 is a plan view of a roller pad arm and the two pad rollers thereon.

In the figures A indicates the container-box forming a standard for the frame F and the operative parts of the camera secured in the box by means of legs 2 2 and securing screw 3. From the box at the end protrudes the lens L on the lens barrel screwed to lens holder L'. The frame is provided at the opposite end with upper and lower arms 4 4 on which are journaled the upper and lower, or the feed and take-up magazines, M M', and with various journal bearings for the various shafts: bearing 25 for the main-drive-shaft C carrying the main gear 6 and on its outer end the operating crank or handle 7, bearing 8 for the countershaft 9, bearing 10 for the eccentric lockingshaft 11, bearing 60 for the shaft of the intermediate gear 59, bearing for the picker shaft 56, and bearing 82 for the shuttershaft 81. From the upper magazine M the film 1 passes over the feed sprocket S, against which it is held by means next to be described, thence in an upper loop to the film-trap, where it is held in true position by special means, thence in a lower loop back to the sprocket and thence to the lower magazine.

11 is the hinge for the magazine door, 12 a suitable lock therefor and 17 a stud engaging with a hole in the frame to hold the magazine against rotation.

5 is the light-tight valve on the magazine for the film.

*Roller pad arms*, Figs. 1, 3 and 4.—Heretofore a spring actuated arm, or retainer, has been used to retain the film on the feed-sprocket and in that case, when the perforations were out of alinement, or the patching of two strips was defective, the film would push up the arm and ride the sprocket, whereby the film would be injured and often entirely ruined. I have devised a mechanism, easy of adjustment, whereby the film is held positively in position without danger of escaping. Upper and lower roller-padarms R are provided each carrying two padrollers 13 to engage with the film and hold it in engagement with sprocket S on shaft C. Said roller arms are slotted at their rear ends to fit the retaining studs 14. At their front ends these arms are provided with cam slots 15 15 engaging with locking pins 16 16 on the frame, whereby the arms may be locked in open or shut, that is in releasing or operative, positions, and springs 18 are provided arranged in recesses 19 in the frame and extending between spring posts 21 and 22, respectively on the arm and the frame, whereby tension is applied to the arms to hold them forwardly against the pins 16. 34 are thumb-pieces for convenient manipulation. The cam slots are so designed, that the arms cannot be lifted from the sprocket by pressure radial thereto, which would be the pressure applied by the film, therefore they afford a positive lock for the film. But by applying pressure at an angle as would be natural in taking hold of the thumb piece, they are easily unlocked. Thus these arms are easily adjusted, either open, to permit the film to be threaded, or closed, to hold the film in secure engagement with the sprocket both above and below so that it cannot escape.

I have described and claimed the various improvements herein in connection with motion picture cameras but do not intend to limit the use of said improvements to such machines but to claim them for all mechanisms in which more or less of such improvements might be used, for instance cameras of various sorts and motion picture projectors. I furthermore intend that the matter of the description and drawing shall be taken in an illustrative and not a limiting sense for my improvements might be embodied in different structures and mechanisms, very different in form and appearance.

It will be remembered that these cameras are often operated in the dark, therefore simplicity of the parts to insure ease and certainty of manipulation is important.

149 is a split spring bushing to engage with the lifting rod and hold the parts up.

Having described my invention I claim,—

1. A motion picture camera, comprising a sprocket suitably journaled relative to the magazines and the film trap, means to retain the film on the sprocket, and means for positively locking said first means against radial pressure but yielding to pressure at an angle to such radial pressure.

2. A motion picture camera comprising a sprocket suitably journaled intermediate the magazines and the film trap, swinging arms adjacent the sprocket, members on the arms to engage with the film and hold it in engagement with the sprocket and means to lock said arms in open and shut positions, said means affording a positive lock against pressure by the film, but a yielding lock to pressure at an angle to said film pressure.

3. A motion picture camera comprising a frame, a sprocket suitably journaled thereon intermediate the magazines and the film trap, swinging arms journaled adjacent the sprocket, a pair of rollers journaled on each arm to engage with the film and hold it in engagement with the sprocket, said arms being provided each with an angular or cam slot, a pin on the frame extending into each slot said pin being adapted to engage with either end of the slot to lock the arm in closed or open position, and a spring connected to each arm to hold it against the pin.

4. A motion picture camera comprising a frame, a sprocket suitably journaled thereon, swinging arms having slots in their rear ends, journal pins engaging with said rear ends, said arms being respectively upwardly and downwardly inclined from said pins on opposite sides of the sprocket, a pair of rollers arranged on each arm and outwardly extending therefrom parallel to the sprocket, said rollers being adapted to apply substantially radial pressure to the film to maintain it in engagement with the sprocket, the forward ends of the arms being provided with laterally arranged angular or cam slots, a cam pin on the frame extending into each of said slots and adapted to engage with one end on the other thereof to lock the arm in open or closed position, a spring post on each arm, a spring post on the frame, and a tension spring extending between said posts to draw the arm forward against the cam pin.

5. A motion picture camera comprising a frame, a sprocket suitably journaled thereon intermediate the magazines and the film trap, swinging arms journaled adjacent the sprocket, a pair of rollers journaled on each arm to engage with the film and hold it in engagement with the sprocket, said arms being provided each with a surface, a pin engaging with said surface, and to lock the arm in closed or open position by engagement with different parts of the surface, and a spring connected to each arm, to hold it against the pin.

6. A motion picture camera comprising a frame, a sprocket suitably journaled thereon, swinging arms having slots in their rear ends, journal pins engaging with said rear ends, said arms being respectively upwardly and downwardly inclined from said pins on opposite sides of the sprocket and adjacent thereto, a pair of rollers journaled on each arm and outwardly extending therefrom parallel to the sprocket, said rollers being adapted to apply substantially radial pressure to the film to maintain it in engagement with the sprocket, thumb-pieces adjacent the forward ends and on the outer sides of the arms, said forward end being provided with a laterally arranged angular or cam slot between the rollers, a cam pin on the frame extending into each of said slots and adapted to engage with one end or the other thereof to lock the arm in open or closed position, a spring pin on each arm, a spring pin on the frame, and a tension spring extending between said pins to draw the arm forward against the cam pin, said spring pin and spring being arranged in a depression in the frame, substantially as described and shown.

7. In a moving picture mechanism having means for feeding a film across an aperture, a feed-sprocket having teeth to engage with the film perforations, and means for retaining the film on the sprocket, comprising a swinging arm on at least one side of the sprocket, a roller on the arm to engage with the film, and means to lock the arm in open and closed position.

8. In a moving picture mechanism having means for feeding a film across an aperture, a feed-sprocket to engage with the film before and after it has passed the aperture, and means for retaining the film on the sprocket comprising swinging arms and a roller on each arm to engage with the film on each side of the sprocket.

9. In a moving picture mechanism having means for feeding a film across an aperture, a single feed-sprocket having teeth to engage with the film perforations and means for retaining the film on opposite sides of the sprocket both before and after crossing the aperture, comprising a pair of swinging arms, a projection on each arm to engage with the film on the respective sides of the sprocket and means to hold the rollers in open and closed positions.

10. A machine of the character described having film carrying parts comprising a sprocket and means associated therewith for retaining the film thereon, said means being adapted to resist pressures substantially radial to the sprocket and to yield to pressures at an angle to such radial pressures.

11. A machine of the character described having film carrying parts comprising a sprocket and means associated therewith for retaining the film thereon, said retaining means consisting of an arm supported pivotally and to have a longitudinal movement engaging means to prevent radial movement of the arm, a spring connected to the arm for yieldingly holding it in locking engagement with the engaging means and means on the arm to engage the film.

In testimony whereof I have signed my name to this specification in the presence of two subscribing witnesses.

FRANCIS B. CANNOCK.

Witnesses:
J. R. MILLWARD,
M. L. BRESLIN.